(12) United States Patent
Dahn et al.

(10) Patent No.: US 7,556,655 B2
(45) Date of Patent: Jul. 7, 2009

(54) METHOD OF PRODUCING LITHIUM ION CATHODE MATERIALS

(75) Inventors: Jeffrey R. Dahn, Hubley (CA); Severine Jouanneau, Fontaine (FR); Kevin W. Eberman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 648 days.

(21) Appl. No.: 10/757,645

(22) Filed: Jan. 13, 2004

(65) Prior Publication Data

US 2004/0179993 A1    Sep. 16, 2004

Related U.S. Application Data

(60) Provisional application No. 60/454,884, filed on Mar. 14, 2003.

(51) Int. Cl.
  *H01M 4/04* (2006.01)
  *H01M 4/50* (2006.01)
  *H01M 4/52* (2006.01)

(52) U.S. Cl. .................. 29/623.1; 429/223; 429/224; 429/231.3; 429/231.1

(58) Field of Classification Search .............. 29/623.1; 429/223, 224, 231.1, 231.3
See application file for complete search history.

(56) References Cited

U.S. PATENT DOCUMENTS

| | | | |
|---|---|---|---|
| 4,612,600 A | 9/1986 | Hodgkins | |
| 5,674,645 A | 10/1997 | Amatucci et al. | |
| 5,759,720 A | 6/1998 | Amatucci | |
| 5,773,168 A * | 6/1998 | Kubo et al. | ............... 429/223 |
| 5,900,385 A | 5/1999 | Dahn et al. | |
| 5,955,219 A | 9/1999 | Nishijima et al. | |
| 5,993,998 A | 11/1999 | Yasuda | |
| 6,699,618 B2 * | 3/2004 | Noda et al. | ............... 429/224 |
| 7,205,072 B2 * | 4/2007 | Kang et al. | ........... 429/231.95 |
| 2003/0180620 A1 | 9/2003 | Nakane et al. | |

FOREIGN PATENT DOCUMENTS

| | | |
|---|---|---|
| EP | 1 035 600 | 9/2000 |
| JP | 2000-195514 | 7/2000 |
| JP | 2002184404 | 6/2002 |
| JP | 2002-304993 | 10/2002 |
| JP | 2002304993 A * | 10/2002 |

(Continued)

OTHER PUBLICATIONS

A.R. Armstrong et al., *Nature*, 1996, 381, 499.

(Continued)

*Primary Examiner*—Tracy Dove
(74) *Attorney, Agent, or Firm*—Lucy C. Weiss; Dean M. Harts; Stephen F. Wolf

(57) ABSTRACT

A method of producing $Li_y[Ni_xCo_{1-2x}Mn_x]O_2$ wherein $0.025 \leq x \leq 0.5$ and $0.9 \leq y \leq 1.3$. The method includes mixing $[Ni_xCo_{1-2x}Mn_x]OH_2$ with LiOH or $Li_2CO_3$ and one or both of alkali metal fluorides and boron compounds, preferably one or both of LiF and $B_2O_3$. The mixture is heated sufficiently to obtain a composition of $Li_y[Ni_xCo_{1-2x}Mn_x]O_2$ sufficiently dense for use in a lithium-ion battery cathode. Compositions so densified exhibit a minimum reversible volumetric energy characterized by the formula [1833-333x] measured in Wh/L.

10 Claims, 5 Drawing Sheets

FOREIGN PATENT DOCUMENTS

| WO | WO 98 10476 | 3/1998 |
|----|-------------|--------|
| WO | WO 02/073718 | 9/2002 |
| WO | WO 02/089234 | 11/2002 |

OTHER PUBLICATIONS

J. Cho et al., *Electrochem Solid State Lett.* 2000, 3, 355.
J. Cho. et al., *Chem. Mater.* 2000, 12, 3788.
J.R. Dahn et al., *Electrochem.Soc.* 1997, 145, 851.
H. Desilvestro et al., The 10th International Meeting on Lithium Batteries, Como, Italy, May 28-Jun. 2, 2000.
Y. Gao et al., *Electrochem. Solid-State Lett.*, 1998, 1, 117.
Y. Jang et al., *Electrochem. Solid-State Lett.* 1998, 1, 13.
S. Jouanneau et al., *Chemistry of Materials*, 15-2, 2003, 495-499.
K. Kubo et al., *Journal of Power Sources*, 68, 1997, 553-557.
M.J. Laurent et al., *Journal of Materials Science* 23 (1998) 4481.
Z. Lu et al., *Electrical and Solid State Lett.*, 2001, 4-12.
J.M. Paulsen et al., *J. Electrochem. Soc.*, 2000, 147, 861.
J.M. Paulsen et al, The 198th Meeting of the Electrochemical Society, Phoenix, Arizona, Oct. 22-27, 2000.
D. MacNeil et al., *J. Electrochem. Soc.* 2002, 149(10), 1332.
S. Marinel et al., *Journal of Materials Science; Materials in Electronis*, 13, (2002) 149-155.
K. Numata et al., *Chem. Lett.* 1997, 725.
K. Numata et al., *Solid State Ionics* 1999, 117, 257.

* cited by examiner

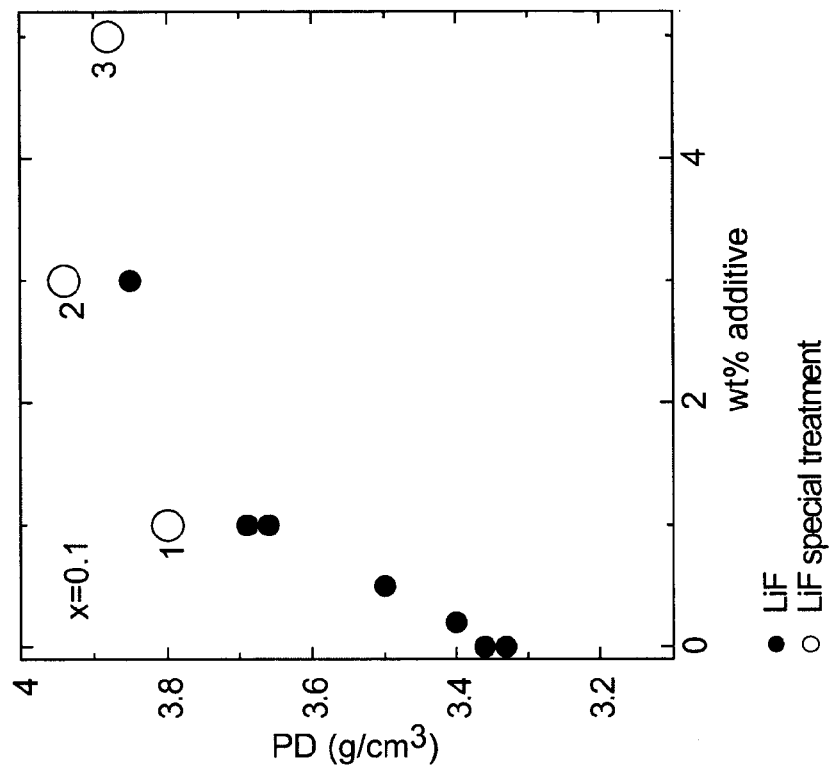
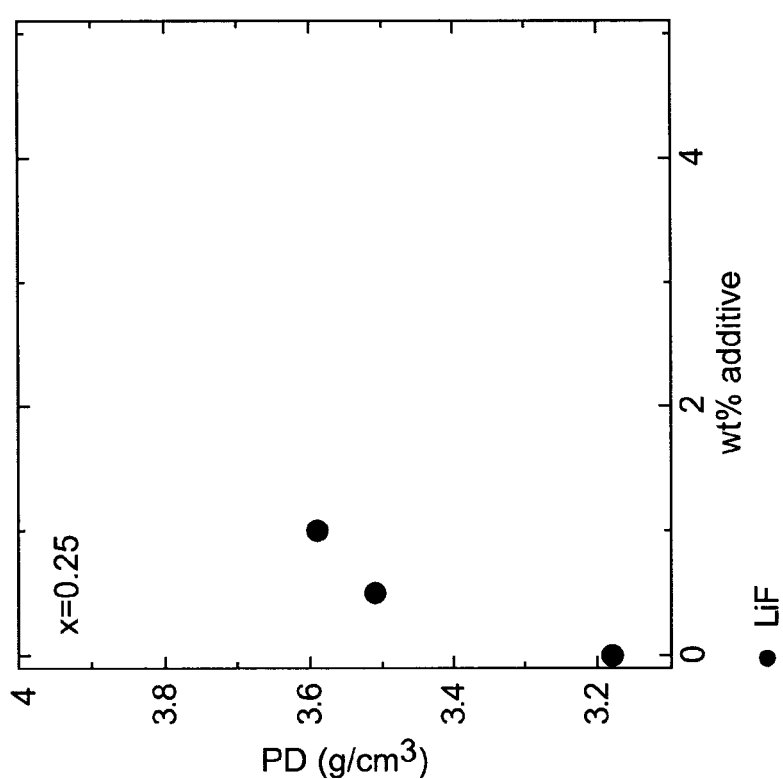
FIG. 2b
FIG. 2a

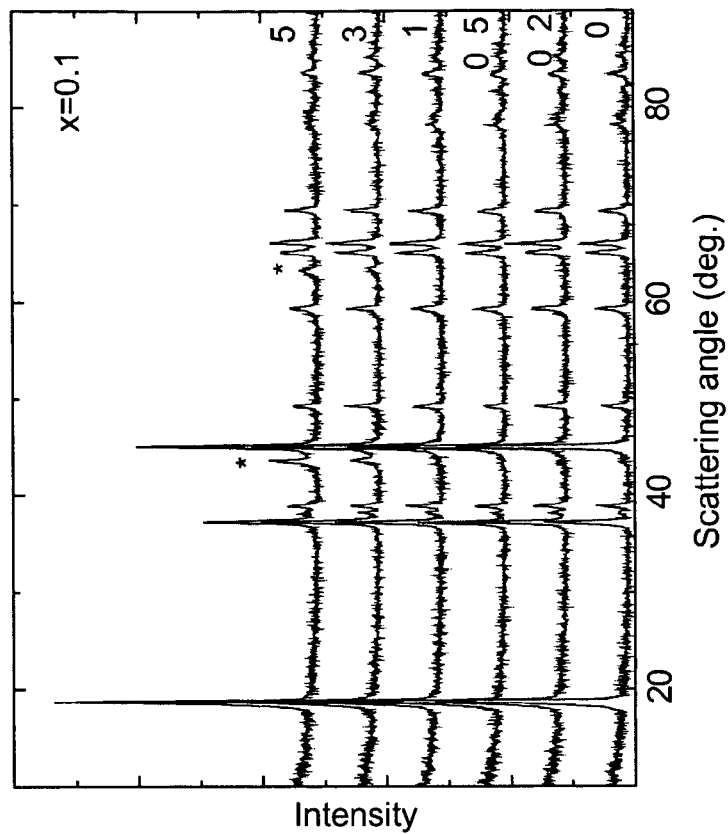
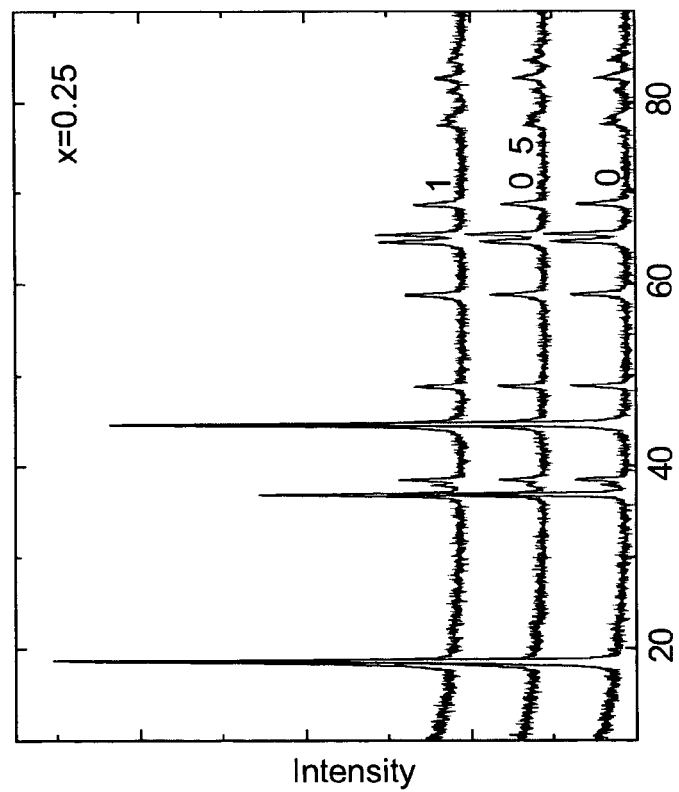
FIG. 4b
FIG. 4a

METHOD OF PRODUCING LITHIUM ION CATHODE MATERIALS

CROSS-REFERENCE TO RELATED APPLICATION(S)

This application claims priority from provisional application 60/454,884 filed on Mar. 14, 2003.

FIELD OF THE INVENTION

The present invention relates to lithium-ion batteries. More particularly, the present invention relates to a method of densifying compositions useful to make electrodes for lithium-ion batteries.

BACKGROUND OF THE INVENTION

Lithium-ion batteries typically include an anode, an electrolyte, and a cathode that contains lithium in the form of a lithium-transition metal oxide. Such lithium-transition metal oxides typically include $LiCoO_2$, $LiNiO_2$ and $Li(NiCo)O_2$. A lithium-transition metal oxide that has been proposed as a replacement for $LiCoO_2$ is $Li_y[Ni_xCo_{1-2x}Mn_x]O_2$ which adopts the $\alpha$-$NaFeO_2$ type structure and can be regarded as the partial substitution of $Ni^{2+}$ and $Mn^{4+}$ (1:1) for $Co^{3+}$ in $LiCoO_2$. $Li_y[Ni_xCo_{1-2x}Mn_x]O_2$ materials prepared at 900° C. exhibit good cell performance and appear to be much less reactive with electrolytes at high temperatures compared to $LiCoO_2$ when charged at high voltage. However, the material density and thus the resulting electrode density of samples previously reported are lower than required for many industrial applications of lithium-ion batteries.

$Li_y[Ni_xCo_{1-2x}Mn_x]O_2$ with x being in the range of 0.25 to 0.375 and y being in the range of 0.9 to 1.3 can deliver a stable capacity of about 160 mAh/g using a specific current of 40 mA/g when cycled between 2.5 V and 4.4 V. Because both nickel and manganese are less expensive than cobalt, $Li_y[Ni_xCo_{1-2x}Mn_x]O_2$ appears as a promising composition to replace $LiCoO_2$. One undesirable feature of $Li_y[Ni_xCo_{1-2x}Mn_x]O_2$ compounds, however, is their low density achieved by the known synthesis of starting from a co-precipitation of hydroxides followed by a heat treatment at about 900° C. This undesirable low electrode density ultimately leads to low volumetric capacities in practical lithium-ion cells.

Denser oxides can be obtained using a synthesis constituted by a more controlled co-precipitation followed by treatment at temperatures greater than or equal to 1100° C. with a slow cooling to preserve cell performance. Such a synthesis, however, is not completely suitable for industrial applications because the controlled precipitation process is difficult and is expensive due to energy requirements to achieve the high heat treating temperatures. Also, oxides synthesized this way exhibit high first cycle irreversible capacity, thus limiting their useful capacity when used in a battery.

It is known in the art that LiF used in producing $Li_{1+x}Mn_{2-x-y}M_yO_4F_z$ (with $0<x<=0.15$, $0<y<=0.3$, and $0<z<=0.3$, and M is a metal comprised of at least one of Mg, Al, Co, Ni, Fe, Cr), can function as a flux for lithium ion electrode materials. The art recognizes that this compound has a spinel crystal structure. Further it is known in the art that a spinel structure requires the nominal ratio of lithium to transition-metal to oxygen in the compound of 1:2:4. LiF is incorporated into the crystalline structure, i.e., main phase, of the lithium transition metal oxide.

The art describes $H_3BO_3$ as a raw material in the synthesis of $Li[(Ni_{0.5}Mn_{0.5})_{1-x-y}M_xB_y]O_2$ (where $0<=x<=0.10$, $0<=y<=0.05$, and M is one of V, Al, Mg, Co, Ti, Fe, Cu, Zn) which can be used as a positive electrode active material. The amount of Co in this compound can be up to 10 atomic percent of the amount of lithium in the synthesized lithium material. The art teaches away from increasing density of this material in the belief that increased density leads to inferior cell performance.

BRIEF SUMMARY OF THE INVENTION

Briefly, a method of producing $Li_y[Ni_xCo_{1-2x}Mn_x]O_2$ wherein $0.025\leq x\leq 0.45$ and $0.9\leq y\leq 1.3$, includes mixing $[Ni_xCo_{1-2x}Mn_x](OH)_2$ with $LiOH$ or $Li_2CO_3$ and one or both of alkali metal fluorides (preferably LiF) and boron compounds (for example, boric acid, boron oxide, and/or lithium borates), hereinafter referred to as sintering agent, and then heating the mixture for a time sufficient to obtain a densified composition of $Li_y[Ni_xCo_{1-2x}Mn_x]O_2$, the product being sufficiently dense for use in a lithium-ion battery. Compositions so densified exhibit a minimum reversible volumetric energy characterized by the formula [1833-333x] measured in Wh/L, wherein x is as previously defined, and wherein the densified compound is substantially free of F. Preferably x has a value in the range of 0.05 to 0.45 and y has a value in the range of 1.0 to 1.1.

Although dense oxides can also be obtained using a synthesis including a heating step at high temperature (1100° C.), such a heat treatment is not considered suitable for industrial applications because 1100° C. heating places severe constraints on furnaces that do not apply for about 900° C. heating.

In a preferred embodiment, the density is increased by using a sintering agent involving about 0.1 to about 5.0 wt %, preferably about 0.2 to about 3.0 wt %, more preferably about 0.5 to about 1.0 wt %, of one or both of lithium fluoride and boron oxide at a heating temperature of approximately 900° C. during the synthesis of $Li[Ni_xCo_{1-2x}Mn_x]O_2$.

This process provides a product with advantages of increased density, low irreversible capacity, and enhanced cathode performance such as greater reversible volumetric energy. Useful pellet density values are in the range of about 3.3 to about 4.0 g/cm³, and preferably about 3.4 to about 4.0 g/cm³.

The sintering temperature can be in the range of 800° C. to less than 1100° C., preferably 850° C. to 1050° C., and more preferably about 900° C. Higher temperatures increase the processing cost and there is less availability of suitable processing equipment.

The lithium transition metal oxides of the invention have a layered $\alpha$-$NaFeO_2$ structure that requires a nominal ratio of lithium to transition metal to oxygen of 1:1:2.

BRIEF DESCRIPTION OF THE DRAWINGS

FIGS. 2a and 2b graphically illustrate pellet density (PD) for $Li_y[Ni_xCo_{1-2x}Mn_x]O_2$ prepared at 900° C. as a function of LiF addition for x=0.25 (FIG. 2a) and x=0.1 (FIG. 2b) composition.

FIGS. 4a and 4b graphically illustrate x-ray diffraction patterns for $Li_y[Ni_xCo_{1-2x}Mn_x]O_2$ for x=0.25 (FIG. 4a) and x=0.1 (FIG. 4b) as a function of LiF addition.

DETAILED DESCRIPTION OF PREFERRED EMBODIMENTS

Figure 1:
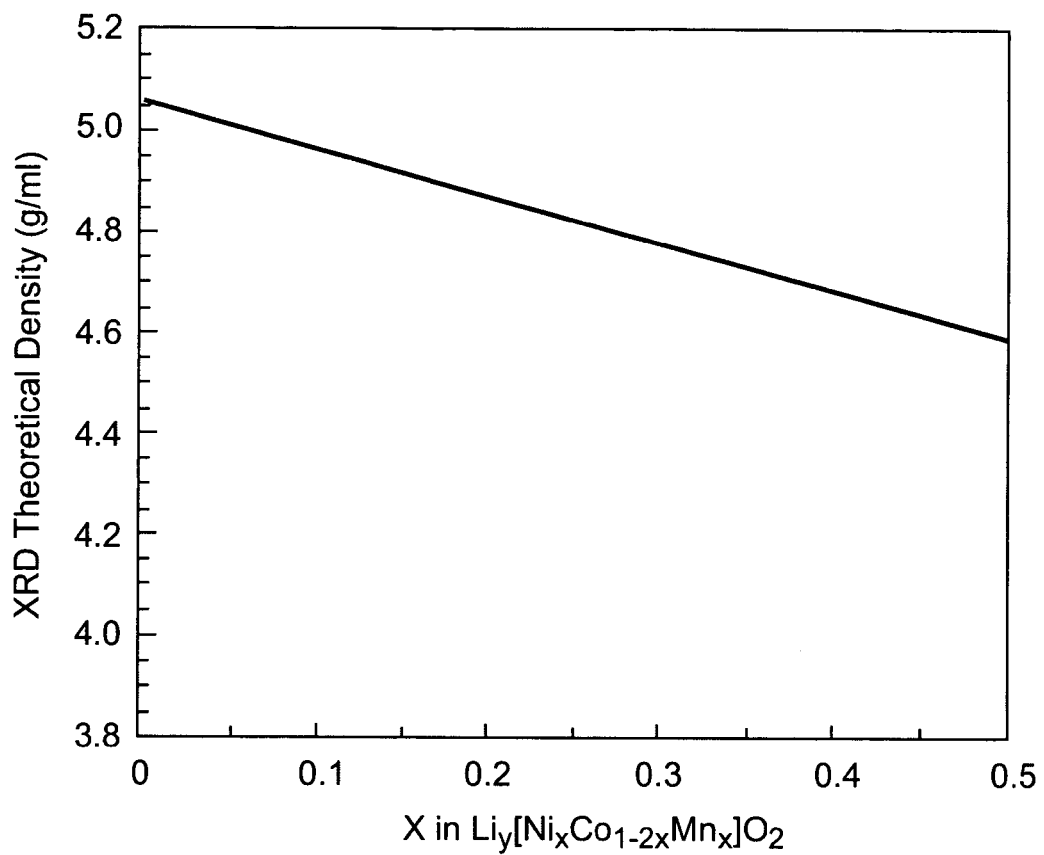
FIG. 1 shows the theoretical density (XRD) of $Li_y[Ni_xCo_{1-2x}Mn_x]O_2$ as a function of x obtained through x-ray diffraction.

The present invention includes a method of producing lithium transition metal oxides sufficiently dense for use in electrode compositions, preferably cathode compositions, for lithium-ion batteries. Compositions having a pellet density of greater than about 3.3 g/cm³ can be obtained using a sintering agent selected from the group consisting of alkali metal fluorides (for example, LiF and/or KF; preferably LiF), boron compounds (for example, boric acid, boron oxide, and/or lithium borates; preferably, $B_2O_3$), and mixtures thereof, at a level of at least about 0.1 wt % of the total weight of the mixture. Higher levels of sintering agent such as about 1.0 wt % also produce higher pellet densities. It is understood that when precursors have a high surface area, then greater levels of sintering agents can be required to produce the same increased pellet density. Levels of sintering agent as high as about 5 wt % and even up to about 10 wt % can produce yet even higher pellet densities. At levels of about 3 weight percent and higher, additional heating time can be required to remove impurities from the product. Impurities of F, which would be present in a separate phase, are undesirable because their presence reduces the reversible volumetric energy (RVE). The stoichiometry of the lithium in the starting material can be adjusted to compensate for the additional lithium being added by the use of LiF as a sintering agent.

The lithium transition metal oxides of the present invention exhibit certain characteristics that have been discovered as being useful for enhancing electrode performance. These characteristics include increased density properties, without increasing the irreversible capacity significantly, and resulting increased electrochemical properties including RVE. A density property of interest is pellet density. Pellet density is that density calculated from the weight of lithium transition metal oxide (500 mg were used in the measurements in the examples of this invention) placed within a mold having a known volume (an 8 mm diameter die was used in the measurements in the examples of this invention), with the lithium transition metal oxide being pressed at approximately 48,000 psi (330,000 kPa). The resulting calculation gives a weight per volume quantity or density. The pellet density can be compared against theoretical density to ascertain the extent of densification of the lithium metal oxide. The theoretical density (ThD) is defined as follows:

$$ThD(g/ml)=[10^{24}(MW)(N)]/[(CV)(NA)].$$

where $10^{24}$ is the number of cubic angstroms per milliliter, MW is the molecular weight of the compound expressed in grams per mole, N is the number of molecular units per unit cell, CV is the volume of the unit cell expressed in cubic angstroms per unit cell and NA is Avogadro's number ($6.023 \times 10^{23}$ molecular units per mole). A unit cell is a small repeating physical unit of a crystal structure. The type of structure and lattice constants, which together give the unit cell volume, can be determined by x-ray diffraction. Because the present materials have the α-NaFeO₂ structure-type, the cell volume can be calculated from the lattice constants a and c as follows:

$$CV=(a^2)(c)(\cos(30°))$$

An electrochemical property of interest with regard to the present invention is reversible volumetric energy (RVE).

$$RVE=(DSC_1)(V_{aveD})(ED)(DSC_1/CSC_1).$$

RVE (reversible volumetric energy) (watt-hours per liter) is the amount of electrical energy stored per unit volume of the cathode electrode that can be recycled after the first charge. RVE values of the invention preferably are in the range of about 1500 to about 2200 Wh/L, more preferably in the range of about 1750 to about 2200 Wh/L.

$DSC_1$ (First Discharge Specific Capacity) (milliamp-hours per gram) is the amount of electrical charge passed by a battery per gram of cathode oxide during first discharge.

$V_{aveD}$ (volts) is the average voltage during discharge from a battery. For the present cathode materials $V_{aveD}$ refers to the voltage of the cathode versus lithium metal, and values of 3.85 and 3.91 V are close approximations of $V_{aveD}$ for x=0.25 and x=0.10 respectively and shall be assumed in calculations of RVE.

$CSC_1$ (First Charge Specific Capacity (milliamp-hours per gram)) is the amount of electrical charge passed by a battery per gram of cathode oxide during first charge.

ED (electrode density) (gram per milliliter) is the density of the cathode electrode, and shall be considered to be 90% of the pellet density.

Capacities of a battery described herein are those obtained when cycling the battery at 40 milliamp per gram of cathode oxide.

The lithium transition metal oxide of the present invention was prepared using a co-precipitation process to form a transition-metal hydroxide (TMOH). The precipitated TMOH was then mixed by grinding with a combined amount of Li(OH).H₂O and sintering agent. Li₂CO₃ can be used instead of LiOH. After grinding, pellets were formed and then heated to about at least 900° C. for about 3 hours, and quenched. After quenching, the pellets were ground and the resulting powder was used to make cathodes. Although pellets were made, it is understood that the ground mixture of TMOH and lithium salts can be subjected to heat treatment with essentially the same results for a heated loose powder.

The present invention is more particularly described in the following examples, which are intended as illustrations only and are not to be construed as limiting the present invention.

EXAMPLES

The lithium metal oxides of the present invention were prepared using the following as starting materials: LiOH.H₂O (98%+, Aldrich Chemical Co., Milwaukee, Wis.), CoSO₄.7H₂O (99%+, Sigma-Aldrich Co. of Highland, Ill.), NiSO₄.6H₂O (98%, Alfa Aesar, Ward Hill, Mass.), and MnSO₄.H₂O (Fisher Scientific, Hampton, N.H.). Where not designated, chemicals were obtained from Aldrich Chemical Co., Milwaukee, Wis. All percentages were by weight.

The process to densify lithium metal oxides of the present invention included two steps. The first step involved a co-precipitation of transition metal sulfates in a stirred solution of LiOH to obtain a co-precipitate. It is understood that a solution including any one or more of LiOH, NaOH, and NH₄OH can be used as the precipitating agent, leading to the same final improvement in density described herein. The second step comprised mixing the co-precipitate with stoichiometric amounts of Li(OH).H₂O and one or both of LiF and B₂O₃ (both available from Aldrich Chemical Co.), forming a pellet and heating the pellet to at least about 900° C.

In performing the first step, a 100 ml aqueous solution of the transition metal sulfates (CoSO₄.7H₂O, NiSO₄.6H₂O and $MnSO_4 \cdot H_2O$) (total metal concentration equal to 1M) was dripped into a stirred aqueous solution of 1 M LiOH. A chemical metering pump manufactured by Liquid Metering Inc. of Acton, Mass. was used at a constant speed and stroke for 1 hour of co-precipitation. LiOH concentration was kept constant during the co-precipitation process by metering a sufficient amount of 1 M LiOH to keep the pH controlled at 14. The co-precipitant produced was $Ni_xCo_{1-2x}Mn_x(OH)_2$ where x is as previously defined. The precipitate was filtered, washed several times with distilled water, dried in air at 120° C. overnight and then ground for 5 minutes to de-agglomerate the powder.

The dried precipitate was then mixed (by grinding) with a stoichiometric amount of $Li(OH) \cdot H_2O$ and selected amounts of one or both of LiF and $B_2O_3$ (0, 0.2, 0.5, 1, 3, 5 wt % of the theoretical oxide mass) (Aldrich Chemical Co.) to keep the desired lithium stoichiometry (1 mole per total moles of transition metal) in the final oxide. After grinding, pellets were made, heated at 900° C., some for 3 hours and some for 6 hours and then quenched between copper plates. The pellets were quenched to save time. The pellets could have been air cooled slowly with essentially the same results. Once the pellets were cooled, they were broken up and ground.

X-ray diffraction (XRD) was used to determine which crystalline phases were present in the sample and the structural characteristics of those phases. The data was collected using an X-ray diffractometer fitted with a fixed entrance slit with 1 degree divergence, a fixed 0.2 mm receiving slit (0.06 degrees), a graphite diffracted beam monochromator, and a proportional detector for registry of the scattered radiation. A sealed copper target X-ray source was used at generator settings of 40 kV and 30 mA. Profile refinement of the collected data was made using a Hill/Howard version of the Rietveld program Rietica. The structural model typically used was the $\alpha$-$NaFeO_2$ structure with Li in 3a sites, Ni, Co and Mn randomly placed on 3b sites, and oxygen atoms on 6c sites. An anti-site defect was assumed wherein Li and Ni exchanged sites, the slight extent of which was calculated as part of the Rietveld refinement.

Pellet density (PD) for each sintered set was obtained by making 8 mm diameter pellets with approximately 500 mg of ground powder under a pressure of 48,000 psi (30,096 kPa). The thickness and diameter of the pellet after pressing was measured and the density was then calculated. The error was estimated to be $\pm 0.08$ g/cm$^3$.

In order to develop the correlation between pellet density and electrode density, test electrodes of five different $Li_y[Ni_xCo_{1-2x}Mn_x]O_2$, wherein x and y are as previously defined, were made. $Li_y[Ni_xCo_{1-2x}Mn_x]O_2$ (90 parts), SUPER S carbon black (5 parts) (MMM Carbon, Tertre, Belgium), and polyvinylidene difluoride (PVDF) (5 parts) binder were combined to make electrode material. The electrode material was made into a slurry using n-methyl pyrrolidinone (NMP) and the slurry was then coated on aluminum foil. The electrode material coated on aluminum foil was dried in a muffle oven overnight to evaporate the NMP and form a film. The film was pressed at 48,000 psi (330,096 kPa). Electrode density was obtained by measuring the thickness of the film with a digital micrometer and measuring the mass of a known area of the film. Five different samples graphically gave a slope of 0.89 when the intercept was constrained to be zero. The achievable electrode density was thus considered to be 90% of the pellet density.

In order to perform electrochemical tests, a Bellcore-type cell was prepared. The Bellcore-type cell included 200 to 300 mm thick PVDF/HFP-based (a copolymer of polyvinylidene fluoride/hexafluoropropylene) positive and negative electrodes and an electrolyte separator.

The Bellcore-type cell was prepared by taking z grams $Li_y[Ni_xCo_{1-2x}Mn_x]O_2$ which was mixed with approximately 0.1(z) (by weight) SUPER S carbon black and 0.25(z) (by weight) polymer binder, available under the trade designation KYNAR FLEX 2801 (Atofina Chemicals, Inc. of Philadelphia, Pa.). To this mixture was added 3.1(z) (by weight) acetone and 0.4(z) (by weight) dibutyl phthalate (DBP), available through Aldrich Chemical Co., of Milwaukee, Wis., to dissolve the PVDF/HFP. Several hours of stirring and shaking were required to dissolve the PVDF/HFP and to break apart clumps of carbon black. The resulting slurry was then spread on a glass plate using a notch bar spreader to obtain an even thickness of approximately 0.66 mm. After the acetone had evaporated, the resulting dry film was peeled off the plate and punched into circular disks with a diameter of approximately 12 mm. The punched circular disks (electrodes) were washed several times in anhydrous diethyl ether to remove the DBP. The washed electrodes were dried at 90° C. overnight before use. The electrochemical cells were prepared in standard 2325 (23 mm diameter, 2.5 mm thickness) coin-cell hardware with a single lithium metal foil used as both the counter and reference electrode. The cells were assembled in an argon-filled glovebox. The electrolyte used for analysis was 1M lithium hexafluorophosphate ($LiPF_6$) in ethylenecarbonate-diethylcarbonate (EC/DEC) (33/67). The cells were tested using a constant charge and discharge current of 40 mA/g (corresponding to approximately 0.6 mA/cm$^2$) between 2.5 and 4.4 V.

FIGS. 2a and 2b graphically illustrate the pellet density evolutions as a function of LiF addition for $Li_y[Ni_xCo_{1-2x}Mn_x]O_2$ compositions for x=0.25 (FIG. 2a) and x=0.1 (FIG. 2b). In both cases, pellet density increased with added LiF. For x=0.1, the pellet density increased quasi-linearly from about 3.3 to about 3.7 g/cm$^3$ until 1 wt % of LiF was added. The values stabilized around 3.8-3.85 g/cm$^3$ with further addition of LiF. Open circles refer to special treatments. A slight excess in lithium stoichiometry, as noted by open circle "1" in FIG. 2b led to a slightly higher pellet density compared to the Li/M=1/1 stoichiometry where M is the total of transition metals in the compound. Another treatment of 3 hours at 900° C. led to another slight increase in pellet density as indicated by samples noted by open circles "2" and "3" in FIG. 2b.

Figure 3:
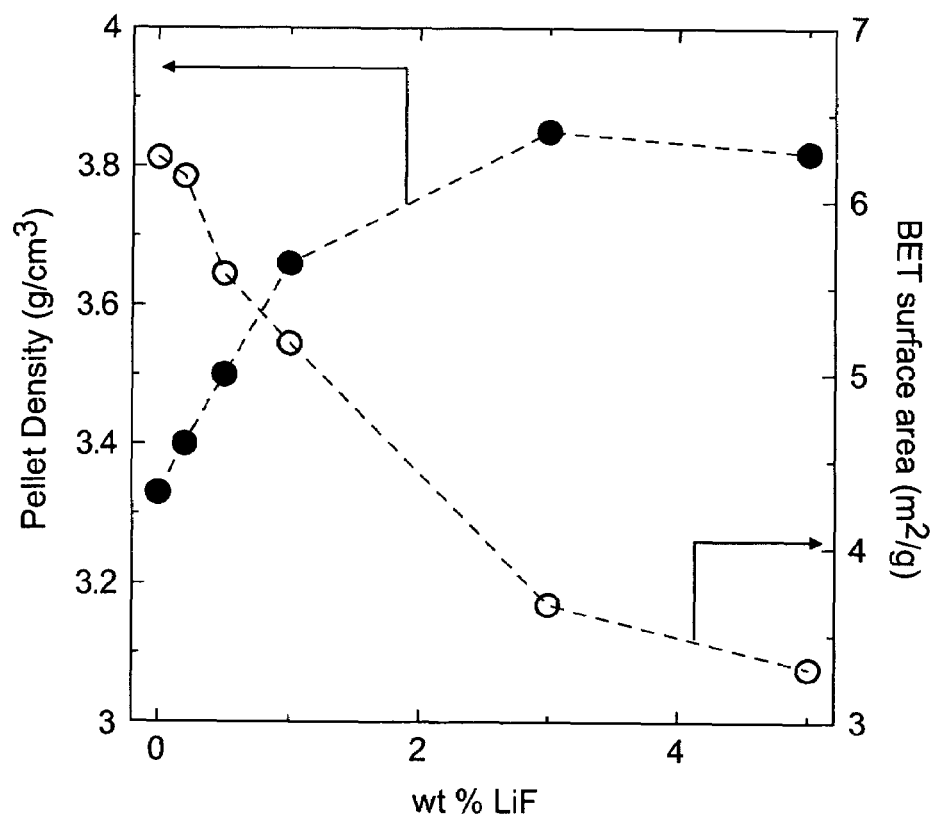
FIG. 3 shows the BET surface area and pellet density evolutions as a function of wt % LiF added in $Li_y[Ni_xCo_{1-2x}Mn_x]O_2$ for x=0.1.

FIG. 3 shows the correlation between the decrease in BET surface area while the pellet density increased as a function of LiF addition in the case of $Li_y[Ni_xCo_{1-2x}Mn_x]O_2$ with x=0.1 (all samples prepared from the same co-precipitate). The data show the specific surface area of $Li_y[Ni_xCo_{1-2x}Mn_x]O_2$ samples prepared at about 900° C. decreased and the density increased as the weight percent of LiF increased. Typically, electrode materials with higher specific surface area can lead to less-safe Li-ion cells by increasing the interface area between the electrolyte and the electrode grains. Lower specific surface area is of interest in increasing the thermal stability of the cell.

Structural data obtained from Rietveld refinements are collected in Table 1. The $\alpha$-$NaFeO_2$ structural type was preserved in all cases and x-ray patterns and lattice constants of the starting compounds were those typically previously observed for these compositions.

TABLE 1

| Sample | LiF (wt %) | a (Å) | c (Å) | Fraction of Ni in Li-layer |
|---|---|---|---|---|
| x = 0.1 | 0 | 2.8310(2) | 14.135(2) | 0.011(3) |
| x = 0.1 | 0 | 2.8312(3) | 14.135(2) | 0.011(3) |
| x = 0.1 | 0.2 | 2.8305(2) | 14.135(2) | 0.000(3) |
| x = 0.1 | 0.5 | 2.8297(3) | 14.134(2) | 0.013(3) |
| x = 0.1 | 1 | 2.8294(2) | 14.131(2) | 0.000(3) |
| x = 0.1 | 1 | 2.8309(2) | 14.132(2) | 0.009(3) |
| x = 0.1 | 3 | 2.8272(3) | 14.137(2) | not measured |
| x = 0.1 | 3 (re-heated 3 hours) | 2.8282(3) | 14.136(2) | 0.005(3) |
| x = 0.1 | 5 | 2.8228(4) | 14.132(3) | not measured |
| x = 0.1 | 5 (re-heated 3 hours) | 2.8234(3) | 14.138(2) | 0.006(3) |
| x = 0.1 | 5 (re-heated 6 hours) | 2.8231(3) | 14.142(2) | 0.013(3) |
| x = 0.25 | 0 | 2.8493(2) | 14.199(2) | 0.009(3) |
| x = 0.25 | 0.5 | 2.8508(2) | 14.208(2) | 0.016(3) |
| x = 0.25 | 1 | 2.8513(2) | 14.210(2) | 0.011(3) |

Parenthetical value refers to uncertainty in the last digit of the measurement.

The data of Table 1 show that constants a and c were unaffected by the addition of LiF, indicating that the crystal structure dimension was essentially free of LiF.

FIGS. 4a and 4b graphically illustrate similar patterns (wt % of LiF indicated on each pattern) for all samples for both compositions $Li_y[Ni_xCo_{1-2x}Mn_x]O_2$ where x=0.25 (FIG. 4a) and where x=0.1 (FIG. 4b) regardless of whether LiF was added except with 3 and 5 wt % LiF addition for x=0.1 wherein some impurity lines clearly appeared (FIG. 4b). For x=0.25 (FIG. 4a), the lattice constants evolution trend was a minimal increase as LiF increased from 0 to 1 wt % (* in FIG. 4b indicates impurity lines).

Table 1 also lists the amount of metal defect (Ni) in the Li layer, calculated as part of the Rietveld refinement, which is known to influence the cell behavior. In all cases, as expected for these compositions, this amount was very small and no significant change was noticed as a function of LiF addition. Table 2 shows cycling data at 40 mA/g between 2.5 and 4.4 V for $Li_y[Ni_xCo_{1-2x}Mn_x]O_2$. with x=0.25 (0, 0.5 and 1 wt % LiF addition), x=0.1 (0 and 1 wt % LiF addition) and x=0.1 (0, 0.2, 0.5, 1, 3, 3(+3 hours) and 5 wt % LiF addition).

Table 2 lists wt % LiF, pellet density for each sample, first charge/discharge energy, irreversible capacity and RVE for samples of lithium transition metal oxide where x=0.1 and 0.25.

TABLE 2

| Sample | LiF (wt %) | PD (g/cm³) | 1st Charge/1st Discharge (mAh/g) | % Irreversible Capacity | RVE (Wh/L) |
|---|---|---|---|---|---|
| x = 0.1 | 0 | 3.4 | 175/162 | 7.4 | 1794 |
| x = 0.1 | 0 | 3.3 | 166/150 | 9.6 | 1574 |
| x = 0.1 | 0.2 | 3.4 | 157/145 | 7.6 | 1602 |
| x = 0.1 | 0.5 | 3.5 | 161/153 | 5.0 | 1791 |
| x = 0.1 | 1 | 3.7 | 173/163 | 5.8 | 2000 |
| x = 0.1 | 1 | 3.7 | 157/148 | 5.7 | 1817 |
| x = 0.1 | 3 | 3.85 | 141/128 | 9.2 impurity | 1574 |
| x = 0.1 | 3 (re-heated 3 hours) | 3.94 | 164/149 | 9.1 | 1877 |
| x = 0.1 | 5 | 3.8 | 113/96 | 15 impurity | 1091 |
| x = 0.25 | 0 | 3.2 | 177/165 | 6.8 | 1705 |
| x = 0.25 | 0.5 | 3.5 | 173/161 | 6.9 | 1817 |
| x = 0.25 | 1 | 3.6 | 173/155 | 10.4 | 1732 |

PD = Pellet Density
RVE = Reversible Volumetric Energy

The data of Table 2 show that use of LiF gave improved RVE values compared to those when no LiF is present. Impurities in the composition resulted in a marked decrease in RVE values. Capacity retention upon cycling maintained stable and good values with use of LiF. The cycled capacity was the same, the RVE was improved.

Comparing Table 2 with FIG. 1, it is preferable that the lithium transition-metal oxides of the present invention have a pellet density of at least about 72%, and more preferable that they have a pellet density of at least about 74%, of the theoretical density. Furthermore, it has been found that the reversible volumetric energy of the lithium transition-metal oxide of the present invention can be defined by the formula [1833-333x] as measured in Wh/L.

LiF addition had an effect on increasing the density of $Li_y[Ni_xCo_{1-2x}Mn_x]O_2$ oxides to 3.6 g/cm³ for x=0.25 and to 3.7 g/cm³ for x=0.1 up to 1 wt % LiF added. This increase in density was accompanied by a decrease in BET surface area. Almost no influence on the materials structure was observed. No difference at all in material structure was found for x=0.1 composition up to and including additions of LiF as high as 1 wt % for lattice constants (a) and (c) (Table 1) and cell behavior (Table 2). At and above about 3 wt % addition of LiF, a "LiF impurity" containing some transition metal appeared and led to lower cell performances for the oxide. It was found that another 3 hours treatment at about 900° C. of the 3 wt % LiF addition led to a material without impurity, same lattice constants (a) and (c) as without any additive, and with the same cell behavior as the lower amount LiF addition samples but having a higher density of about 3.9 g/cm³. It was also found that LiF additions above about 10% by weight were believed to add fluorine to the structure of the transition metal oxide. Using other alkali metal fluorides, such as KF as sintering agents, desirable pellet density values and RVE values can be obtained when using the procedures described above.

Figure 5A:
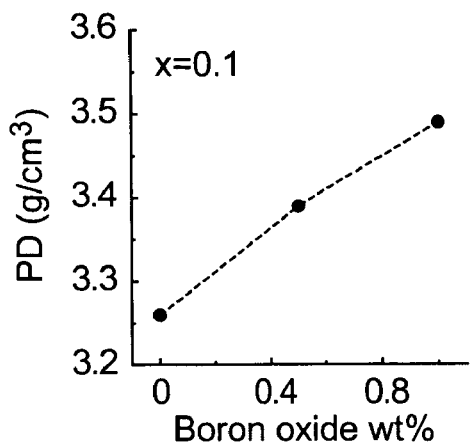
FIGS. 5a, 5b, and 5c graphically illustrate the effect of $B_2O_3$ addition on the pellet density of different oxide compositions prepared at 900° C. for 3 hours for x=0.1, 0.25 and 0.375.
Figure 5B:
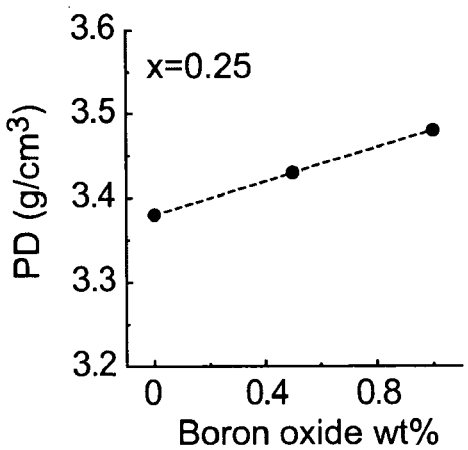
Figure 5C:
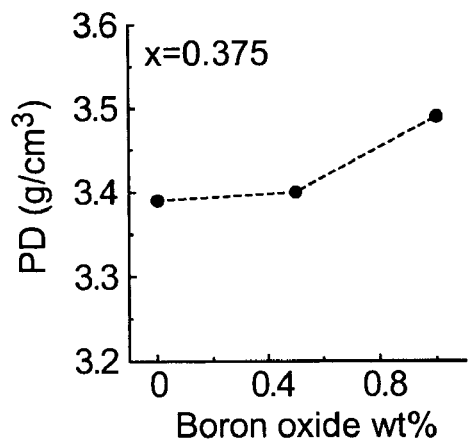

FIGS. 5a, 5b and 5c graphically illustrate the effect of boron oxide addition on the pellet density of different oxide compositions prepared at 900° C. for 3 hours. All samples for each composition were obtained from the same co-precipitate. The graphs show pellet density for oxides prepared at 900° C. for 3 hours for 3 compositions: x=0.1 (FIG. 5a), x=0.25 (FIG. 5b) and x=0.375 (FIG. 5c) as a function of $B_2O_3$ addition. For all compositions, the pellet density increased as a function of boron oxide content.

Table 3 lists wt % $B_2O_3$, pellet density for each sample, first charge/discharge energy, irreversible capacity and RVE for samples of lithium transition metal oxide where x=0.1 and 0.25.

TABLE 3

| Sample | Wt % $B_2O_3$ | PD (g/cm³) | First Charge/First Discharge mAh/g | % Irreversible Capacity | RVE (Wh/L) |
|---|---|---|---|---|---|
| x = 0.1 | 0 | 3.3 | 174/154 | 11.5 | 1583 |
| x = 0.1 | 0.5 | 3.4 | 163/147 | 9.8 | 1586 |

TABLE 3-continued

| Sample | Wt % $B_2O_3$ | PD (g/cm$^3$) | First Charge/First Discharge mAh/g | % Irreversible Capacity | RVE (Wh/L) |
|---|---|---|---|---|---|
| x = 0.1 | 1 | 3.5 | 166/151 | 9.0 | 1692 |
| x = 0.25 | 0 | 3.35 | 163/152 | 6.7 | 1645 |
| x = 0.25 | 0.5 | 3.4 | 172/153 | 11.0 | 1603 |
| x = 0.25 | 1 | 3.5 | 173/147 | 15.0 | 1515 |

Table 3 shows that for x=0.1 the resulting increase in RVE on going from 0 to 1 wt % $B_2O_3$ is from 1583 to 1692 Wh/L. Using other boron compounds, such as boric acid and lithium borates as sintering agents, desirable pellet density values and RVE values can be obtained when using the procedures described above.

Although the present invention has been described with reference to preferred embodiments, workers skilled in the art will recognize that changes may be made in form and detail without departing from the spirit and scope of the invention.

The invention claimed is:

1. A method of producing $Li_y[Ni_xCo_{1-2x}Mn_x]O_2$ wherein $0.1 \leq x \leq 0.375$, and $0.9 \leq y \leq 1.3$, the method comprising:
    grinding a dry precipitate of $[Ni_xCo_{1-2x}Mn_x]OH_2$ with a stoichiometric amount of $LiOH \cdot H_2O$ or $Li_2CO_3$ and at least one boron compound as sintering agent to form a resulting mixture; and
    heating the resulting mixture until a sufficiently dense composition of $Li_y[Ni_xCo_{1-2}Mn_x]O_2$ having a pellet density of from about 3.3 to about 3.5 g/m$^3$ is obtained for use in a lithium-ion battery, to form a densified composition of $Li_y[Ni_xCo_{1-2x}Mn_x]O_2$,
    wherein the total amount of boron compound(s) is greater than 0.2% and up to about 10% of the total weight of the mixture.

2. The method of claim 1 wherein the resulting mixture is heated to at least about 900° C.

3. The method of claim 1 wherein the resulting mixture is heated for at least about 3 hours.

4. The method of claim 1 wherein the resulting mixture is heated for at least about 6 hours.

5. The method of claim 1 wherein the amount of sintering agent being mixed is about 0.2 to about 5.0 weight percent of the resulting mixture.

6. The method of claim 1 wherein the amount of sintering agent being mixed is in the range of about 0.2 to about 3.0 weight percent of the resulting mixture.

7. The method of claim 5 wherein the resulting mixture is heated for about 3 hours.

8. The method of claim 1 characterized by the resulting densified composition of $Li_y[Ni_xCo_{1-2x}Mn_x]O_2$, exhibiting a reversible volumetric energy of at least [1833-333x] measured in Wh/L.

9. The method of claim 1 wherein the pellet density of the resulting densified composition of $Li_y[Ni_xCo_{1-2x}Mn_x]O_2$ is at least about 72 percent of theoretical density.

10. The method of claim 1 wherein said sintering agent is selected from the group consisting of boron oxide, boric acid, and lithium borates.

* * * * *

UNITED STATES PATENT AND TRADEMARK OFFICE
CERTIFICATE OF CORRECTION

PATENT NO. : 7,556,655 B2  Page 1 of 2
APPLICATION NO. : 10/757645
DATED : July 7, 2009
INVENTOR(S) : Jeffrey Dahn It is certified that error appears in the above-identified patent and that said Letters Patent is hereby corrected as shown below:

Page 2, Column 2,
Line 4, Item [56], References Cited, OTHER PUBLICATIONS, delete "Electrical" and insert --Electrochemical-- therefor.

Line 9, Item [56], References Cited, OTHER PUBLICATIONS, delete "Materials" and insert --Material-- therefor.

Line 10, Item [56], References Cited, OTHER PUBLICATIONS, delete "Electronis" and insert --Electronics-- therefor.

Drawings,
In the drawings, Sheet 4, Fig. 4a, delete "0 5" and insert --0.5-- therefor.

In the drawings, Sheet 4, Fig. 4b, delete "0 5" and insert --0.5-- therefor.

In the drawings, Sheet 4, Fig. 4b, delete "0 2" and insert --0.2-- therefor.

Column 1,
Lines 56-57, delete "$Li_{1+x}Mn_{2-x-y} M_yO_{4-z}F_z$" and insert --$Li_{1+x}Mn_{2-x-y}M_yO_{4-z}F_z$-- therefor.

Column 2,
Lines 19-25, after "battery." delete "Compositions so densified exhibit a minimum reversible volumetric energy characterized by the formula [1833-333x] measured in Wh/L, wherein x is as previously defined, and wherein the densified compound is substantially free of F. Preferably x has a value in the range of 0.05 to 0.45 and y has a value in the range of 1.0 to 1.1." and insert the same on Line 20 as a new paragraph.

Line 37, delete "$Li[Ni_xCo_{1-2x}Mn_x]O_2$" and insert --$Li_y[Ni_xCo_{1-2x}Mn_x]O_2$-- therefor.

Signed and Sealed this

Thirty-first Day of August, 2010

David J. Kappos
*Director of the United States Patent and Trademark Office*

CERTIFICATE OF CORRECTION (continued)
U.S. Pat. No. 7,556,655 B2

Column 4,
Line 33, delete "Li(OH).H$_2$O" and insert --Li(OH)·H$_2$O-- therefor.

Line 48, delete "Li(OH).H$_2$O" and insert --Li(OH)·H$_2$O-- therefor.

Line 50, delete "CoSO$_4$.7H$_2$O" and insert --CoSO$_4$·7H$_2$O-- therefor.

Line 51, delete "NiSO$_4$.6H$_2$O" and insert --NiSO$_4$·6H$_2$O-- therefor.

Line 52, delete "MnSO$_4$.H$_2$O" and insert --MnSO$_4$·H$_2$O-- therefor.

Line 63, delete "Li(OH).H$_2$O" and insert --Li(OH)·H$_2$O-- therefor.

Columns 4 and 5,
Lines 67 and 1 (respectively), delete "(CoSO$_4$.7H$_2$O, NiSO$_4$.6H$_2$O and MnSO$_4$.H$_2$O)" and insert --(CoSO$_4$·7H$_2$O, NiSO$_4$·6H$_2$O and MnSO$_4$·H$_2$O)-- therefor.

Column 5,
Line 14, delete "Li(OH).H$_2$O" and insert --Li(OH)·H$_2$O-- therefor.

Column 6,
Line 30, delete "ethylenecarbonate-diethlycarbonate" and insert
--ethylenecarbonate-diethylcarbonate-- therefor.

Column 9,
Line 28, Claim 1, after "a" delete "sufficiently dense".

Line 29, Claim 1, delete "Li$_y$[Ni$_x$Co$_{1-2}$Mn$_x$]O$_2$" and insert --Li$_y$[Ni$_x$Co$_{1-2x}$Mn$_x$]O$_2$-- therefor.

Line 30, Claim 1, delete "3.5 g/m$^3$" and insert --3.5 g/cm$^3$-- therefor.

Column 10,
Line 7, Claim 2, after "least" delete "about".

Line 9, Claim 3, after "least" delete "about".

Line 11, Claim 4, after "least" delete "about".

Line 13, Claim 5, after "is" delete "about" and insert --greater than-- therefor.

Line 16, Claim 6, delete "in the range of about" and insert --greater than-- therefor.

Line 26, Claim 9, after "least" delete "about".